US012793392B2

(12) United States Patent
Klein Orbach et al.

(10) Patent No.: US 12,793,392 B2
(45) Date of Patent: Nov. 10, 2026

(54) SYSTEM FOR SAMPLING AGRICULTURAL FIELD IMAGES TO IMPROVE DETECTION ACCURACY

(71) Applicant: Centure Applications LTD, Tel Aviv (IL)

(72) Inventors: Alon Klein Orbach, Tel Aviv (IL); Livne Rosenblum, Tel Aviv (IL); Shelly Bekhor, Tel Aviv (IL); Itzhak Khait, Kibbutz Ein Zivan (IL)

(73) Assignee: Centure Applications LTD, Tel Aviv-Jaffa (IL)

( * ) Notice: Subject to any disclaimer, the term of this patent is extended or adjusted under 35 U.S.C. 154(b) by 11 days.

(21) Appl. No.: 18/433,812

(22) Filed: Feb. 6, 2024

(65) Prior Publication Data

US 2024/0265680 A1 Aug. 8, 2024

Related U.S. Application Data

(60) Provisional application No. 63/483,381, filed on Feb. 6, 2023.

(51) Int. Cl.
*G06V 10/774* (2022.01)
*A01M 7/00* (2006.01)
(Continued)

(52) U.S. Cl.
CPC ......... *G06V 10/774* (2022.01); *A01M 7/0089* (2013.01); *G06V 10/94* (2022.01);
(Continued)

(58) Field of Classification Search
CPC ............................. G06V 20/188; G06V 20/56
See application file for complete search history.

(56) References Cited

U.S. PATENT DOCUMENTS 9,148,995 B2 10/2015 Hrnicek et al.
9,307,222 B1 * 4/2016 Tang ....................... G06F 18/22
(Continued)

FOREIGN PATENT DOCUMENTS

EP 3866593 A1 8/2021
EP 4014734 A1 6/2022
(Continued)

OTHER PUBLICATIONS

Booker, "Technology Targets Spray Control", WEEDit, Blog, 4P., Mar. 22, 2018.
(Continued)

*Primary Examiner* — Frank Johnson
(74) *Attorney, Agent, or Firm* — Intrinsic Law Corp.

(57) ABSTRACT

A system includes an agricultural vehicle, one or more cameras in mechanical communication with the agricultural vehicle, and a computer in electrical communication with the cameras. The computer is programmed to automatically analyze each image for a presence of at least one target plant using a trained machine-learning model, the trained machine-learning model having been trained with first images that include the at least one target plant and second images that do not include the at least one target plant; automatically detect, using the trained machine-learning model, the at least one target plant in a subset of the images; apply an image-selection parameter to the subset of the images to select one or more images for storage; and store the one or more images for machine-learning training in a computer storage device operably coupled to the one or more microprocessors.

14 Claims, 12 Drawing Sheets

(51) Int. Cl.

| | |
|---|---|
| ***G06V 10/94*** | (2022.01) |
| ***G06V 20/10*** | (2022.01) |
| ***G06V 20/56*** | (2022.01) |
| *G06V 20/70* | (2022.01) |

(52) U.S. Cl.

CPC ............ *G06V 20/188* (2022.01); *G06V 20/56* (2022.01); *G06V 20/70* (2022.01)

(56) References Cited

U.S. PATENT DOCUMENTS

| | | | | |
|---|---|---|---|---|
| 10,255,670 | B1 | 4/2019 | Wu et al. | |
| 11,393,049 | B2 | 7/2022 | Khait et al. | |
| 11,944,087 | B2 | 4/2024 | Mizushima et al. | |
| 12,356,977 | B2 | 7/2025 | Glasbrenner et al. | |
| 2011/0285842 | A1* | 11/2011 | Davenport | B61L 27/40 348/116 |
| 2012/0237083 | A1 | 9/2012 | Lange et al. | |
| 2018/0330166 | A1 | 11/2018 | Redden et al. | |
| 2019/0064363 | A1 | 2/2019 | Redden et al. | |
| 2019/0124827 | A1 | 5/2019 | Davis et al. | |
| 2019/0239502 | A1 | 8/2019 | Palomares et al. | |
| 2020/0011019 | A1 | 1/2020 | Serrat et al. | |
| 2020/0029490 | A1 | 1/2020 | Bertucci et al. | |
| 2020/0214281 | A1 | 7/2020 | Koch et al. | |
| 2020/0230633 | A1* | 7/2020 | Serrat | A01M 21/043 |
| 2020/0319024 | A1* | 10/2020 | Takahashi | G01J 3/0272 |
| 2021/0103728 | A1* | 4/2021 | Young | G06V 20/56 |
| 2021/0149406 | A1* | 5/2021 | Javault | A01C 21/005 |
| 2021/0365731 | A1* | 11/2021 | Takahashi | G06N 20/00 |
| 2022/0129673 | A1* | 4/2022 | Yaroshenko | A01B 69/001 |
| 2022/0183208 | A1* | 6/2022 | Sibley | A01B 69/001 |
| 2022/0397517 | A1* | 12/2022 | McQuilkin | A01B 79/005 |
| 2023/0115704 | A1* | 4/2023 | Singh | G06V 40/10 705/333 |
| 2024/0188554 | A1 | 6/2024 | Link-Dolezal et al. | |
| 2024/0206452 | A1 | 6/2024 | Srinivasan et al. | |
| 2024/0224973 | A1 | 7/2024 | Serrat | |
| 2024/0253074 | A1 | 8/2024 | Rees et al. | |
| 2024/0253075 | A1 | 8/2024 | Hamblin et al. | |
| 2024/0257529 | A1* | 8/2024 | Rude | G06V 20/60 |
| 2024/0260563 | A1 | 8/2024 | Klein Orbach et al. | |
| 2024/0276971 | A1 | 8/2024 | Zies et al. | |
| 2025/0072413 | A1 | 3/2025 | Simon et al. | |
| 2025/0093886 | A1 | 3/2025 | Bachman et al. | |
| 2025/0127156 | A1 | 4/2025 | Freudigmann et al. | |

FOREIGN PATENT DOCUMENTS

| | | | |
|---|---|---|---|
| WO | 2020049576 | A2 | 3/2020 |
| WO | 2022064482 | A1 | 3/2022 |
| WO | 2022172274 | A1 | 8/2022 |
| WO | 2024121669 | A1 | 6/2024 |

OTHER PUBLICATIONS

Klein et al., "Nozzles—Selection and Sizing", Cooperative Extension, Institute of Agriculture and Natural Resouces, University of Nebraska—Lincoln, EC141, p. 1-10, 2011.

Wolf, "Optical Spot Spraying and AI Scouting", Sprayers 101, 12 P., Feb. 8, 2019.

International Search Report for PCT Application No. PCT/IL2021/051133, dated Dec. 22, 2021.

Somerville, G. J et al. "Analysing the Number of Images Needed to Create Robust Variable Spray Maps." Precision agriculture 22.5 (2021): 1377-1396. Web. (Year: 2021).

Dammer, K-H, and Do-Soon Kim. "Real-time Variable-rate Herbicide Application for Weed Control in Carrots." Weed research 56.3 (2016): 237-246. Web. (Year: 2016).

* cited by examiner

80

| | Single Report Average Size | Average Report Count Per Second | 1 Hour of Operation Maximum Size |
|---|---|---|---|
| **data** | 1kb | 1440 units x 6 modules x 20 FPS | ~ 5GB |
| **images** | 40kb | 480 units x 2 cameras x 20 FPS | 1,728,000 images<br>~ 65GB |

FIG. 8

Visual Report

90

SYSTEM FOR SAMPLING AGRICULTURAL FIELD IMAGES TO IMPROVE DETECTION ACCURACY

CROSS-REFERENCE TO RELATED APPLICATIONS

This application claims priority to U.S. Provisional Application No. 63/483,381, titled "Sampling Images of Agricultural Field to Improve Detection Accuracy," filed on Feb. 6, 2023, which is hereby incorporated by reference.

TECHNICAL FIELD

This application relates generally to systems for spraying an agricultural field.

BACKGROUND

Agricultural spray systems include cameras to capture images of an agricultural field. Some agricultural spray systems include trained machine-learning models to detect plants or other features in the captured images.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages, and novel features of the disclosure will be set forth in the following detailed description of the disclosure when considered in conjunction with the drawings, which are intended to illustrate, not limit, the invention.

An aspect of the invention is directed to a system comprising an agricultural vehicle; one or more cameras in mechanical communication with the agricultural vehicle, the one or more cameras configured to capture images of an agricultural field in a direction of movement of the agricultural vehicle; a computer in electrical communication with the cameras, the computer including one or more microprocessors; and non-volatile computer memory operatively coupled to the computer. The non-volatile computer memory stores computer-readable instructions that, when executed by the computer, cause the one or more microprocessors to: automatically analyze each image for a presence of at least one target plant using a trained machine-learning model, the trained machine-learning model having been trained with first images that include the at least one target plant and second images that do not include the at least one target plant; automatically detect, using the trained machine-learning model, the at least one target plant in a subset of the images; apply an image-selection parameter to the subset of the images to select one or more images for storage; and store the one or more images for machine-learning training in a computer storage device operably coupled to the one or more microprocessors.

In one or more embodiments, the subset is a first subset, the one or more images are one or more first images, and the computer-readable instructions, when executed by the computer, further cause the one or more microprocessors to apply the image-selection parameter to a second subset of the images to select one or more second images for storage, the trained machine-learning model not detecting the at least one target plant in the second subset of the images; and store the one or more second images for the machine-learning training in the computer storage device.

In one or more embodiments, the image-selection parameter comprises a brightness, a gain, a contrast, or a maximum number of the subset of the images In one or more embodiments, the system further comprises a spray boom attached to the agricultural vehicle, the one or more cameras mounted on the spray boom. In one or more embodiments, the computer is in network communication with a gateway, the gateway configured to send a control signal to set the image-selection parameter; and receive the one or more images to store in a cloud storage.

BRIEF DESCRIPTION OF THE DRAWINGS

For a fuller understanding of the nature and advantages of the concepts disclosed herein, reference is made to the detailed description of preferred embodiments and the accompanying drawings.

FIG. 8 is a table with example parameters from a gateway.

DETAILED DESCRIPTION

A selective-sprayer system and/or a scout system with a trained machine learning model captures a large volume of images while moving across an agricultural field. The collected images are sampled and tagged/annotated to improve the training of machine learning models and/or to troubleshoot the system. Image sampling can be performed using heuristic logic such as disagreement of detection algorithms ensemble, high weeds pressure area, and/or other image-selection parameters to identify collected images that may be useful for machine-learning model training and/or troubleshooting.

Figure 1:
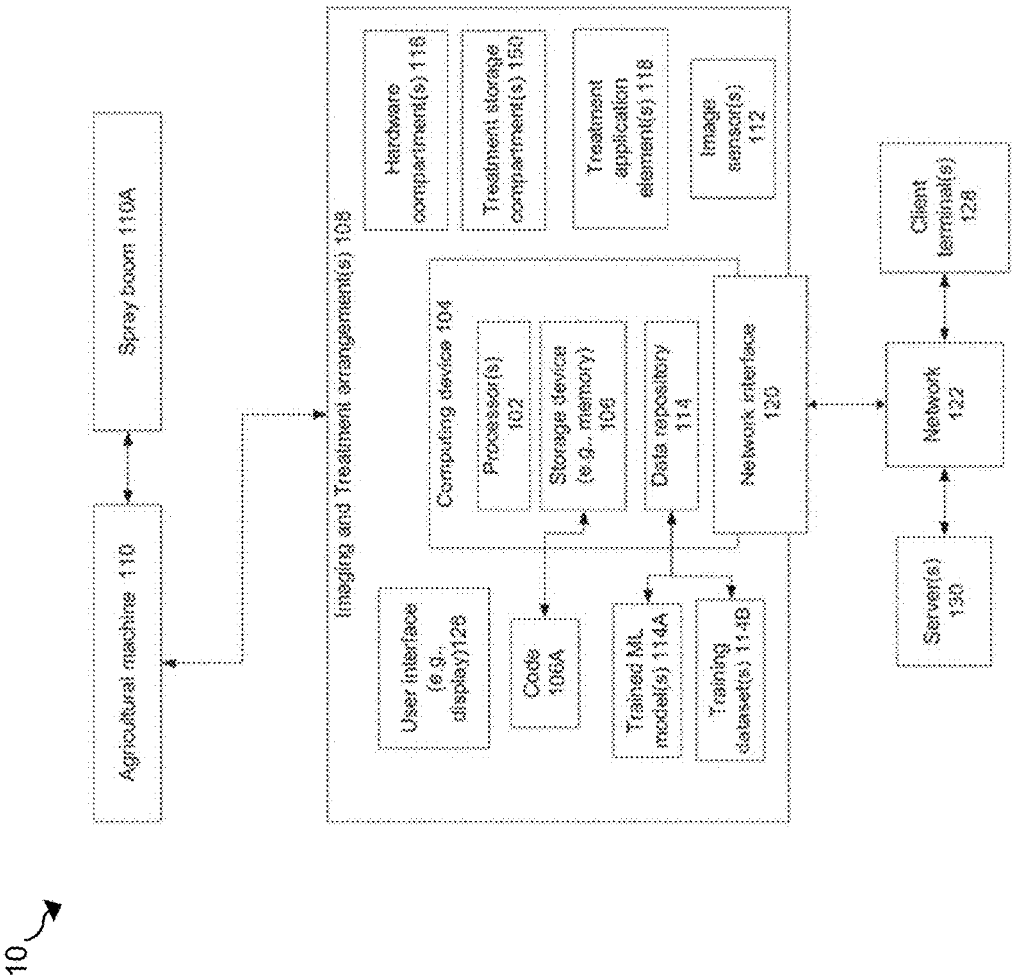
FIG. 1 is a block diagram of a system for selectively applying a treatment to a target region according to an embodiment.

FIG. 1 is a block diagram of a system for selectively applying a treatment to a target region according to an embodiment. System 10 includes one or more imaging and treatment arrangements 108 connected to an agricultural machine 110, for example, a tractor, an airplane, an off-road vehicle, or a drone. Agricultural machine 110 may include and/or be connected to a spray boom 110A and/or another boom. Imaging and treatment arrangements 108 may be arranged along a length of agricultural machine 110 and/or spray boom 110A. For example, the imaging and treatment arrangements 108 can be evenly spaced every 1-3 meters along the length of spray boom 110A. Boom 110A may be long, for example, 10-50 meters, or other lengths. Boom 110A may be pushed or pulled by agricultural machine 110. In another embodiment, the system 10 only includes one imaging and treatment arrangement 108.

An example imaging and treatment arrangement 108 is depicted for clarity, but it is to be understood that system 10 may include multiple imaging and treatment arrangements 108 as described herein. It is noted that each imaging and treatment arrangement 108 may include all components described herein. Alternatively, one or more imaging and treatment arrangements 108 share one or more components, for example, multiple imaging and treatment arrangements 108 share a common computing device 104, common memory 106, and/or common processor(s) 102.

Each imaging and treatment arrangement 108 includes one or more image sensors 112, for example, a color sensor, optionally a visible light-based sensor, for example, a red-green-blue (RGB) sensor such as CCD and/or CMOS sensors, and/or other cameras and/or other sensors such as an infra-red (IR) sensor, near infrared sensor, ultraviolet sensor, fluorescent sensor, LIDAR sensor, NDVI sensor, a three-dimensional sensor, and/or multispectral sensor. Image sensor(s) 112 are arranged and/or positioned to capture images of a portion of the agricultural field (e.g., located in front of image sensor(s) 112 and along a direction of motion of agricultural machine 110).

A computing device 104 receives the image(s) from image sensor(s) 112, for example, via a direct connection (e.g., local bus and/or cable connection and/or short-range wireless connection), a wireless connection and/or via a network. The image(s) are processed by processor(s) 102, which feeds the image into a trained machine learning model 114A (e.g., trained on training dataset(s) 114B which may not be included in system 10). The machine learning model 114A can be configured to detect one or more target features (e.g., target plants such as weeds) within the field of view of the image(s) that is/are separate from a desired growth (e.g., a crop). One treatment storage compartment 150 may be selected from multiple treatment storage compartments according to the outcome of ML model 114A, for administration of a treatment by one or more treatment application element(s), as described herein.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Storage device (e.g., memory) 106 stores code instructions executable by hardware processor(s) 102, for example, a random-access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or instructions to be executed by hardware processor(s) 102. Memory 106 can comprise or consist of solid-state memory and/or a solid-state device.

Computing device 104 may include a data repository (e.g., storage device(s)) 114 for storing data, for example, trained ML model(s) 114A which may include a detector component and/or a classifier component. The data storage device(s) 114 also store the captured real-time images taken with the respective image sensor 112. Data storage device(s) 114 may be implemented as, for example, a memory, a local hard-drive, virtual storage, a removable storage unit, an optical disk, a storage device, and/or as a remote server and/or computing cloud (e.g., accessed using a network connection). Additional details regarding the trained ML model(s) 114A and the training dataset(s) 114B are described in U.S. Pat. No. 11,393,049, titled "Machine Learning Models For Selecting Treatments For Treating an Agricultural Field," which is hereby incorporated by reference.

Computing device 104 is in communication with one or more treatment storage compartment(s) (e.g., tanks) 150 and/or treatment application elements 118 that apply treatment for treating the field and/or plants growing on the field. There may be two or more treatment storage compartment(s) 150, for example, one compartment storing chemical(s) specific to a target growth such as a specific type of weed, and another compartment storing broad chemical(s) that are non-specific to target growths such as designed for different types of weeds. There may be one or multiple treatment application elements 118 connected to the treatment storage compartment(s) 150, for example, a spot sprayer connected to a first compartment storing specific chemicals for specific types of weeds, and a broad sprayer connected to a second compartment storing non-specific chemicals for different types of weeds. Other examples of treatments and/or treatment application elements 118 include: gas application elements that apply a gas, electrical treatment application elements that apply an electrical pattern (e.g., electrodes to apply an electrical current), mechanical treatment application elements that apply a mechanical treatment (e.g., sheers and/or cutting tools and/or high pressure-water jets for pruning crops and/or removing weeds), thermal treatment application elements that apply a thermal treatment, steam treatment application elements that apply a steam treatment, and laser treatment application elements that apply a laser treatment.

Computing device 104 and/or imaging and/or treatment arrangement 108 may include a network interface 120 for connecting to a network 122, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 104 and/or imaging and/or treatment arrangement 108 may communicate with one or more client terminals (e.g., smartphones, mobile devices, laptops, smart watches, tablets, desktop computer) 128 and/or with a server(s) 130 (e.g., web server, network node, cloud server, virtual server, virtual machine) over network 122. Client terminals 128 may be used, for example, to remotely monitor imaging and treatment arrangement(s) 108 and/or to remotely change parameters (e.g., image-selection parameters) thereof. Server(s) 130 may be used, for example, to remotely collected data from multiple imaging and treatment arrangement(s) 108 optionally of different agricultural machines, for example, to create new training datasets and/or update exiting training dataset for updating the ML models with new images.

Network 122 may be implemented as, for example, the internet, a local area network, a wire-area network, a virtual network, a wireless network, a cellular network, a local bus, a point-to-point link (e.g., wired), and/or combinations of the aforementioned.

Computing device 104 and/or imaging and/or treatment arrangement 108 includes and/or is in communication with one or more physical user interfaces 126 that include a mechanism for user interaction, for example, to enter data (e.g., define threshold and/or set of rules) and/or to view data (e.g., results of which treatment was applied to which portion of the field).

Example physical user interfaces 126 include, for example, one or more of, a touchscreen, a display, gesture activation devices, a keyboard, a mouse, and voice activated software using speakers and microphone. Alternatively, client terminal 128 serves as the user interface, by communicating with computing device 104 and/or server 130 over network 122.

Treatment application elements 118 may be adapted for spot spraying and/or broad (e.g., band) spraying, for example as described in U.S. Provisional Patent Application No. 63/149,378, filed on Feb. 15, 2021, which is hereby incorporated by reference.

System 10 may include a hardware component 116 associated with the agricultural machine 110 for dynamic adaption of the herbicide applied by the treatment application element(s) 118 according to dynamic orientation parameter(s) computed by analyzing an overlap region of images captured by image sensors 112, for example as described in U.S. Provisional Patent Application No. 63/082,500, filed on Sep. 24, 2020, which is hereby incorporated by reference.

Figure 2:
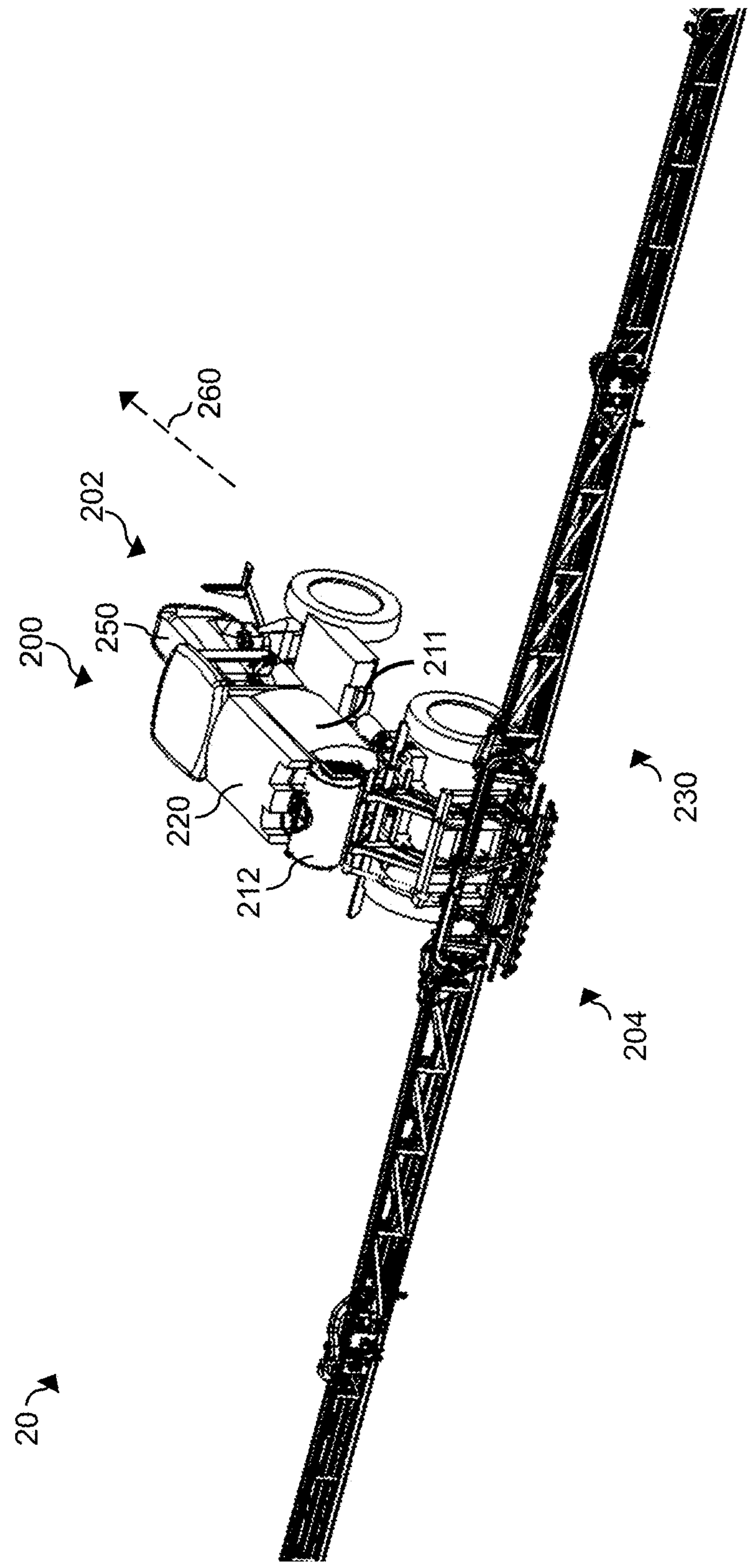
FIG. 2 is an isometric view of a selective sprayer system according to an embodiment.

FIG. 2 is an isometric view of a selective sprayer system 20 according to an embodiment. The system 20 can be the same as system 10. The system 20 includes an agricultural vehicle 200, an optional broadcast tank 211, a selective spot spray (SSP) tank 212, a rinse tank 220, and a spray boom 230.

The optional broadcast tank 211 is mounted on the agricultural vehicle 200 and is configured to hold one or more general-application liquid chemicals (e.g., herbicides) to be sprayed broadly onto an agricultural field using the spray boom 130, which is attached (e.g., releasably attached) to the agricultural vehicle 100. The broadcast liquid chemicals are configured to prevent weeds and/or other undesirable plants from growing. One or more first fluid lines fluidly couple the broadcast tank 211 to broadcast nozzles on the spray boom 230.

The SSP tank 212 is mounted on the agricultural vehicle 200 and is configured to hold one or more target-application or specific chemical(s) (e.g., herbicide(s)) that is/are designed to target one or more weeds growing in the agricultural field. One or more second fluid lines fluidly couple the SSP tank to SSP nozzles on the spray boom 230. The specific chemical(s) in the SSP tank 212 are selectively sprayed using the SSP nozzles in response to imaging of the agricultural field and analysis/detection by one or more trained machine learning models or image processing algorithms. The images of the agricultural field are acquired by an array of cameras or other image sensors that are mounted on the spray boom 230. Valves coupled to the SSP nozzles can be opened and closed to selectively spray the detected weeds.

The rinse tank 220 is fluidly coupled to the broadcast tank 211 and to the SSP tank 212. Water and/or another liquid stored in the rinse tank 220 can be used to rinse the broadcast tank 211 and the SSP tank 212 after each tank 211, 212 is emptied.

The engine 250 for the agricultural vehicle 200 can be replaced with a motor when the agricultural vehicle 200 is electric or can include both an engine and a motor when the agricultural vehicle 200 is a hybrid vehicle. In any case, the agricultural vehicle 200 includes a mechanical drive system that powers the agricultural vehicle 200 and the wheels.

The spray boom 230 is attached to the back 204 of the agricultural vehicle 200 in a first configuration of the system 20 such that the agricultural vehicle 200 pulls the spray boom 230 as the agricultural vehicle 200 drives forward (e.g., in direction 260). In a second configuration of the system 20, the spray boom 230 can be attached to the front 202 of the agricultural vehicle 200 such that the agricultural vehicle 200 pushes the spray boom 230 as the agricultural vehicle 200 drives forward in a direction opposite of direction 260.

Figure 3:
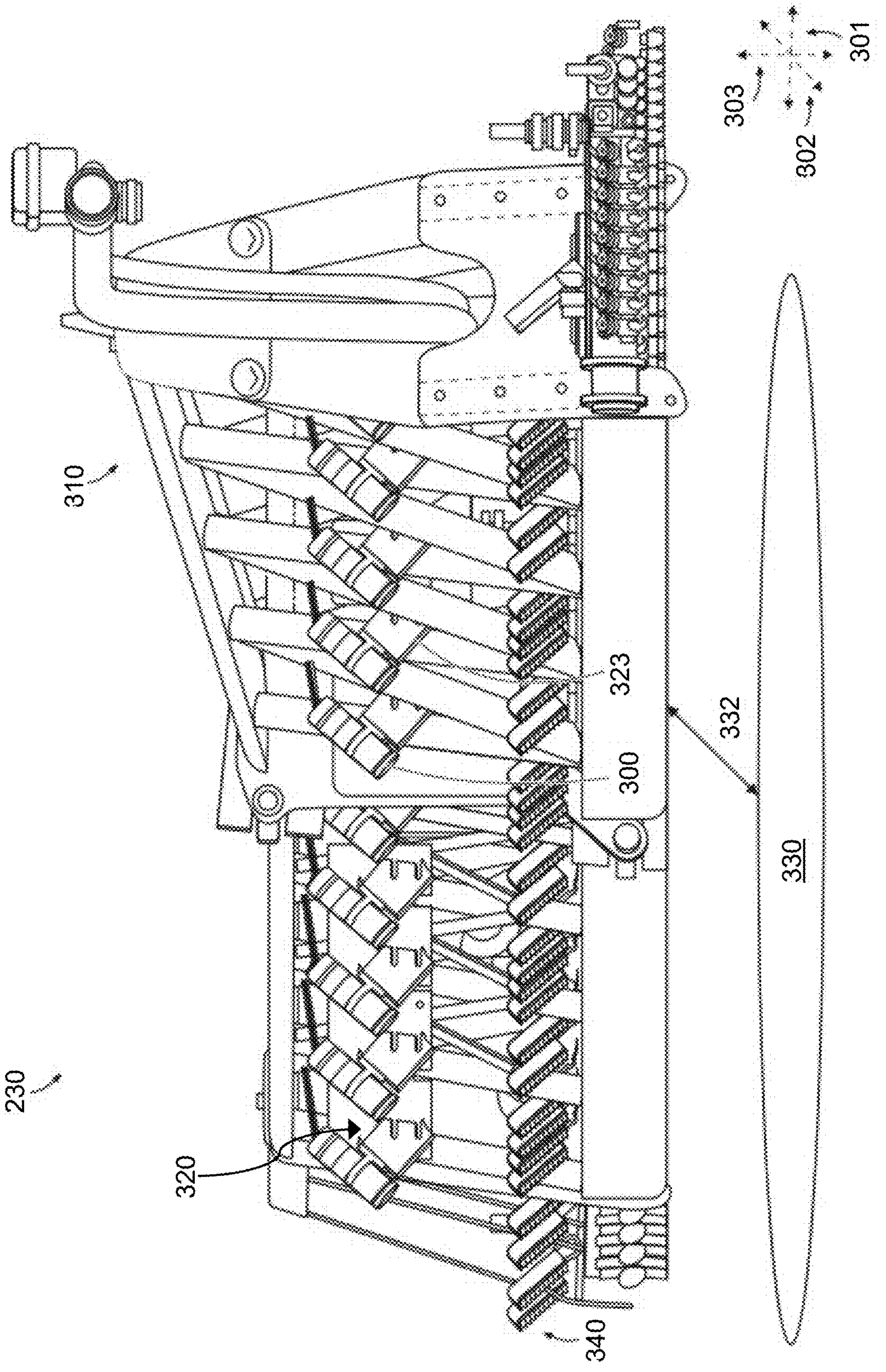
FIG. 3 is an isometric end view of the spray boom illustrated in FIG. 2.

FIG. 3 is an isometric end view of the spray boom 230 according to an embodiment. A plurality (e.g., an array) of cameras 300 or other image sensors are attached to the spray boom 230. Each camera 300 can be mounted on and/or attached to a respective camera frame 310.

The distance between neighboring camera frames 310 and respective cameras 300 (e.g., as measured with respect to a first axis 301) can be optimized according to a predetermined angle of the cameras 300 (e.g., relative to a third axis 303) and the respective field-of-views (FOVs) of the cameras 300 such that an overall FOV 330 of the cameras 300 is continuous at a predetermined distance 332 from the spray boom 230, the distance 332 measured along or with respect to a second axis 302, where axes 301-303 are mutually orthogonal. In one example, the cameras 300 are configured to capture images of respective agricultural field areas that are at least about 50 cm (e.g., about 50 cm to about 100 cm) in front of the spray boom 230 and/or of the agricultural vehicle 200.

A housing 320 can be mounted or attached to some or each camera frame(s) 310. The housing 320 is configured to protect one or more electrical components 323 located in the housing 320. The electrical components 323 can include one or more processors (e.g., computing device 104), computer memory (e.g., storing trained machine-learning models), power supplies, analog-to-digital converters, digital-to-analog converters, amplifiers, and/or other electrical components. The electrical components 323 in the housing 320 are in electrical communication with and/or electrically coupled to one or more cameras 300 and one or more illumination sources 340. For example, the electrical components 323 can include a processor configured to selectively sample images of the agricultural field and stored the sampled images in a storage unit, which can be the same as or different than storage device 106 (e.g., computer memory).

Multiple (e.g., an array of) illumination sources 340 are mounted on the spray boom 230. The illumination sources 340 can be positioned between neighboring cameras 300 and/or between neighboring camera frames 310. The illumination sources 340 can provide broad-spectrum or narrow-spectrum light. The illumination sources 340 are configured to provide uniform (or substantially uniform) lighting within the field of view of the cameras 300 when images are acquired. The illumination sources 340 can be evenly spaced along the length of the spray boom 230 (e.g., with respect to the first axis 301). The illumination sources

340 can comprise light-emitting diodes (LEDs), light pipes (e.g., optical fibers optically coupled to LEDs or other lights), lasers, incandescent lights, and/or other lights.

The system 10, 20 can be used to collect images of the agricultural field during and/or separately from spraying (e.g., selective spraying of target growth such as target weed(s)). One or more parameters of the system 10 can be set or adjusted to control the characterization of, the type of, and/or the volume of images collected. The collected images reflect the real-world operational conditions of the system 10 and can be used to improve the detection accuracy of the system 10. For example, the collected images can be used as additional training images (e.g., in training dataset(s) 114B) to further train and/or debug the trained machine learning model 114A. The collected images can represent a specific type of weed (or other target growth and/or target feature), an area with a high density of weeds, and/or other growth on the field (e.g., to reduce false positives). The collected images can also be stored for manual and/or automatic review (e.g., in a post-run debrief) to identify false negatives (where the trained machine learning model 114A did not detect a target weed (or other target growth and/or target feature) when the image included the target weed) and/or false positives (where the trained machine learning model 114A detected a target weed when the image did not include the target weed). The images representing false negatives and/or false positives can be added to existing training datasets to improve the detection accuracy. In some embodiments, the system 10 can determine whether to collect images based on one or more image parameters, such as brightness, gain (e.g., high gain and/or low gain), contrast (e.g., high contrast, low contrast, and/or contrast ratio). In the event of an inconclusive analysis/decision by the trained machine learning model 114A, the trained machine learning model 114A can be configured to produce an output indicating that one or more weeds (or other target growth and/or target feature) is/are present in an image when the output probability of the trained machine learning model 114A is higher than a threshold probability.

In an alternative embodiment, the images can be collected by a scout system that is configured to collect and analyze images (e.g., with the trained machine learning model 114A) but is not configured to spray (e.g., selectively spray) the field. The scout system can be manually operated or self-propelled and can be self-autonomous in some embodiments. The scout system can drive across the field or can fly over the field (e.g., such as a drone or other aerial vehicle). The scout system can be configured to collect images in the same manner or in a different manner than system 10.

Figure 4:
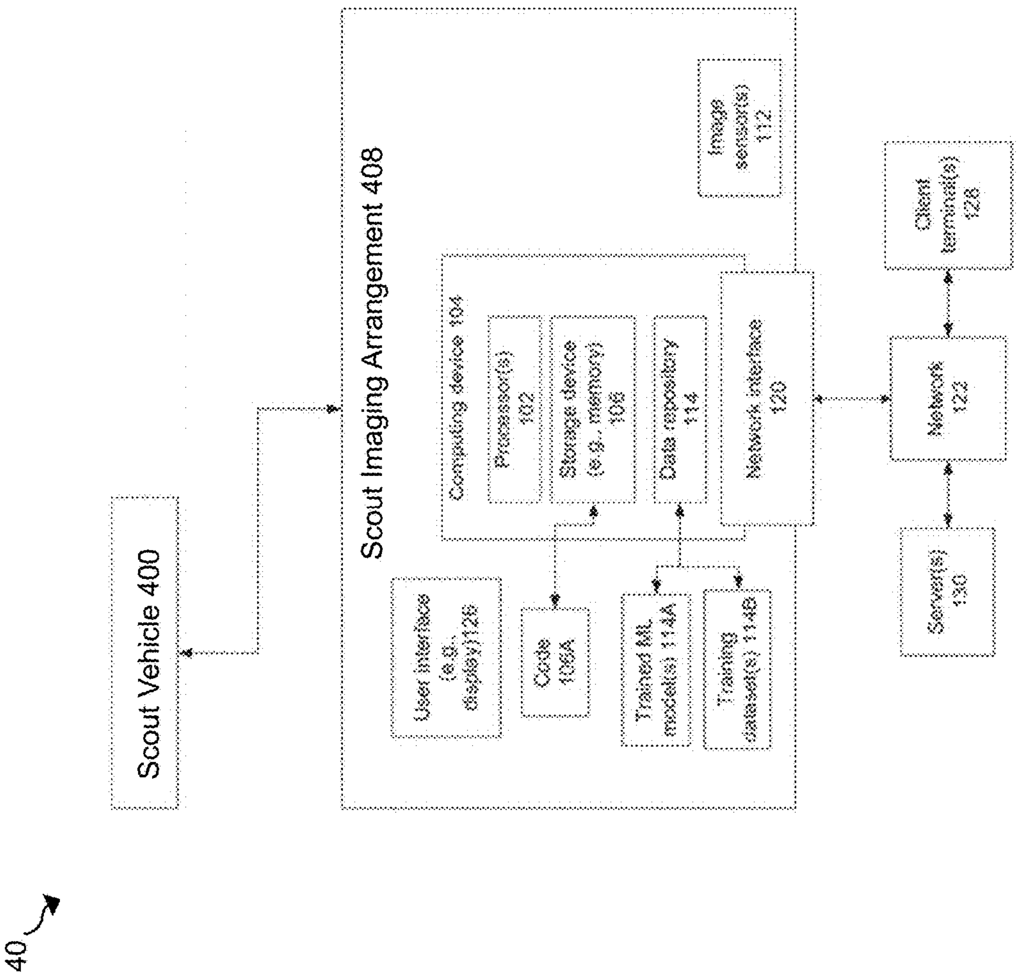
FIG. 4 is a block diagram of a scout system according to an embodiment.

An example of a scout system 40 is illustrated in FIG. 4. Scout system 40 includes a scout vehicle 400 that is coupled to or includes a scout imaging arrangement 408. Scout imaging arrangement 408 is the same as imaging and treatment arrangements 108 except that the scout imaging arrangement 408 does not include hardware component(s) 116, treatment storage compartment(s) 150, and treatment application element(s) 118, which are used to selectively spray the field. In an alternative embodiment, the scout system 40 can include components 116, 118, and/or 150 but can be configured to not use these component(s) during scouting (e.g. they are in an "always off" configuration). Scout vehicle 400 can be a land vehicle or an aerial vehicle.

The system (e.g., system 10, 20, and/or scout system 40) can include a recorder to collect images and/or other data. The recorder and/or the processor can be provided with a data-collection strategy. The data-collection strategy can include the sample rate of images and/or telemetries to be collected. A telemetry indicates the condition the image was taken (e.g., metadata) such as the time of day, date, position, gain, offset of the camera, weather conditions (e.g., cloudy, wind, precipitation), and/or another condition. The recorder is configured to save the sampled data/images in local storage.

Figure 5:
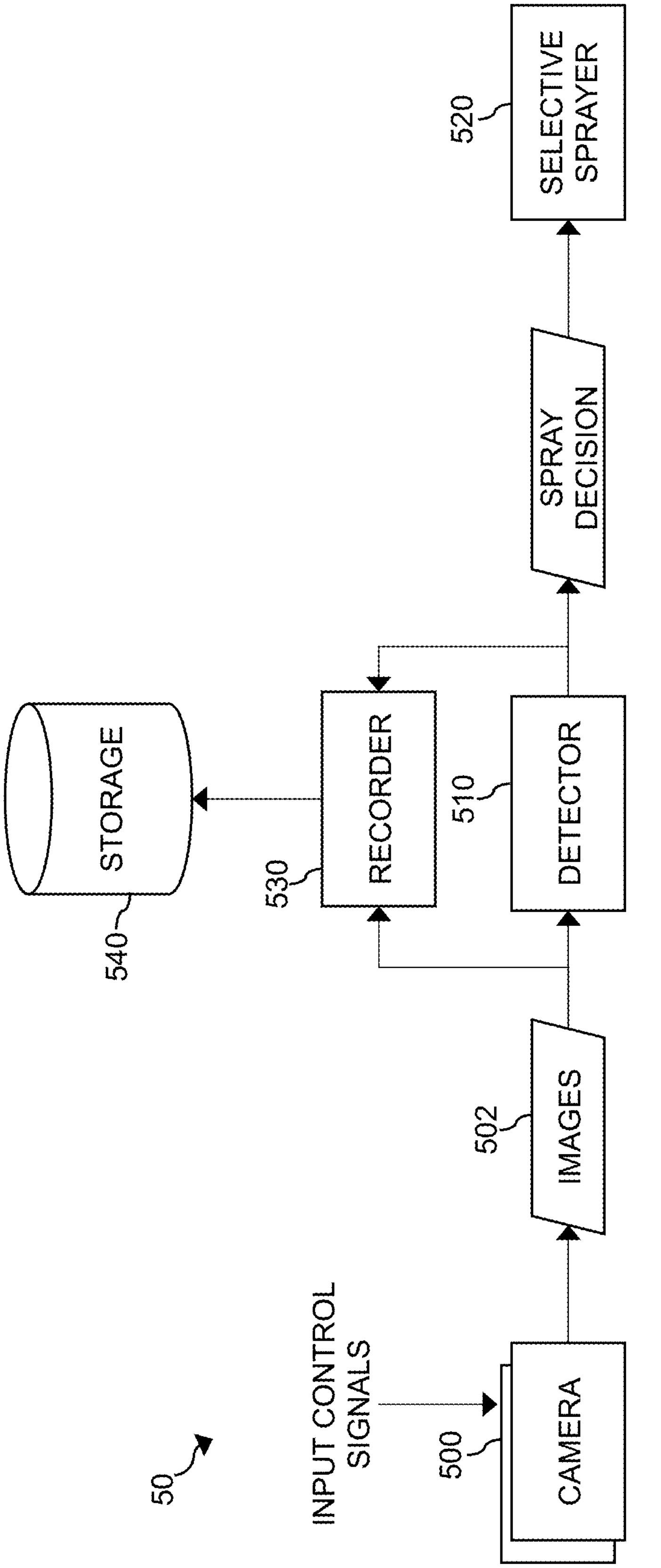
FIG. 5 is a block diagram of an example imaging and treatment arraignment that includes a recorder.

FIG. 5 is a block diagram that illustrates an example imaging and treatment arrangement 50 that includes a recorder. The example imaging and treatment arrangement 50 can be the same as the example imaging and treatment arrangement 108 and/or the scout imaging and treatment arrangement 408. The example imaging and treatment arrangement 50 includes a plurality of cameras 500, a detector 510, a selective sprayer 520, and a recorder 530. The cameras 500 are configured to capture images 502 of respective regions of an agricultural field. The cameras 500 can capture the images 502 in response to one or more input control signals that can trigger one, some, or all of the cameras 500 to capture respective images 502.

The images 502 are fed to the detector 510 which includes a trained machine learning model, such as the trained machine learning model 114A, that is configured to detect one or more target features in the images 502. The target feature(s) can include one or more target plants (e.g., weeds, crops, and/or other plants) and/or one or more fungi. Additionally or alternatively, the target features can include a condition of, a morphology of, phenotype of, and/or other features of the target plant(s).

The recorder 530 is coupled to the output of the cameras 500 and to the output of the detector 510. The recorder 530 can select a subset of the images 502 to store in a storage device 540, which can be separate from or included in the recorder 530. The recorder 530 can select the subset of images to store in the storage device 540 based on one or more image-selection parameters, algorithms, and/or rules. For example, the recorder 530 can select some or all of the subset of images 502 based on random sampling, based on a sampling rate (e.g., every Nth image 502 is stored), a maximum number of images 502 that can be stored, and/or other parameters, algorithms, and/or rules. Additionally or alternatively, the recorder 530 can select some or all of the subset of images 502 based on a brightness, a gain (e.g., high gain and/or low gain), a contrast (e.g., high contrast, low contrast, and/or a predetermined contrast ratio), and/or other features of the images 502. Additionally or alternatively, the recorder 530 can select some or all of the subset of images 502 based on the weather conditions, the time of day, the date, the month, and/or other factors.

Additionally or alternatively, the recorder 530 can select some or all of the subset of images 502 based on an output of the detector 510. For example, the recorder 530 can select some or all of the subset of images 502 for which the detector 510 detected the target feature(s) and/or for which the detector 510 did not detect the target feature(s). The recorder 530 can also use the confidence level of the detector 510 for determining whether the target feature(s) is/are detected in each image as an input to determine whether to include a respective image in the subset of images 502.

The storage device 540 includes non-volatile memory to store the subset of the images 502. The storage device 540 can include a hard drive, a solid-state drive, a flash drive, and/or another computer storage device.

The sampled data/images from multiple systems can be aggregated, for example by sending the sampled data/images to one or more servers. A respective gateway can be configured to collect the sampled data/images from the respective local storage of each system and upload the sampled data/images to one or more servers (e.g., in the cloud).

Various microservices related to data collection can be implemented in the cloud. The cloud microservices can be used to provide full automation of data aggregation. One advantage of cloud microservices is that the cloud can handle large data volumes from multiple sources. In addition, the cloud is scalable and easily accessible to many devices. Continuous improvement of the treatment system is desirable and can be provided by using cloud microservices. One or more components described herein can be implemented as cloud microservices. Microservices can generally refer to architectural style that structures an application as a collection of services that are: highly maintainable and testable, loosely coupled, independently deployable, organized around business capabilities, and/or owned by a small team.

The microservices can include tools used for managing the large amount of data images and respective metadata/telemetry, for creating the ability to search, sort, create reports, manage a tagging pipeline for many human taggers (if this is a word in English), and/or for other tools. The microservices can also include annotating tools to annotate the images.

Figure 6:
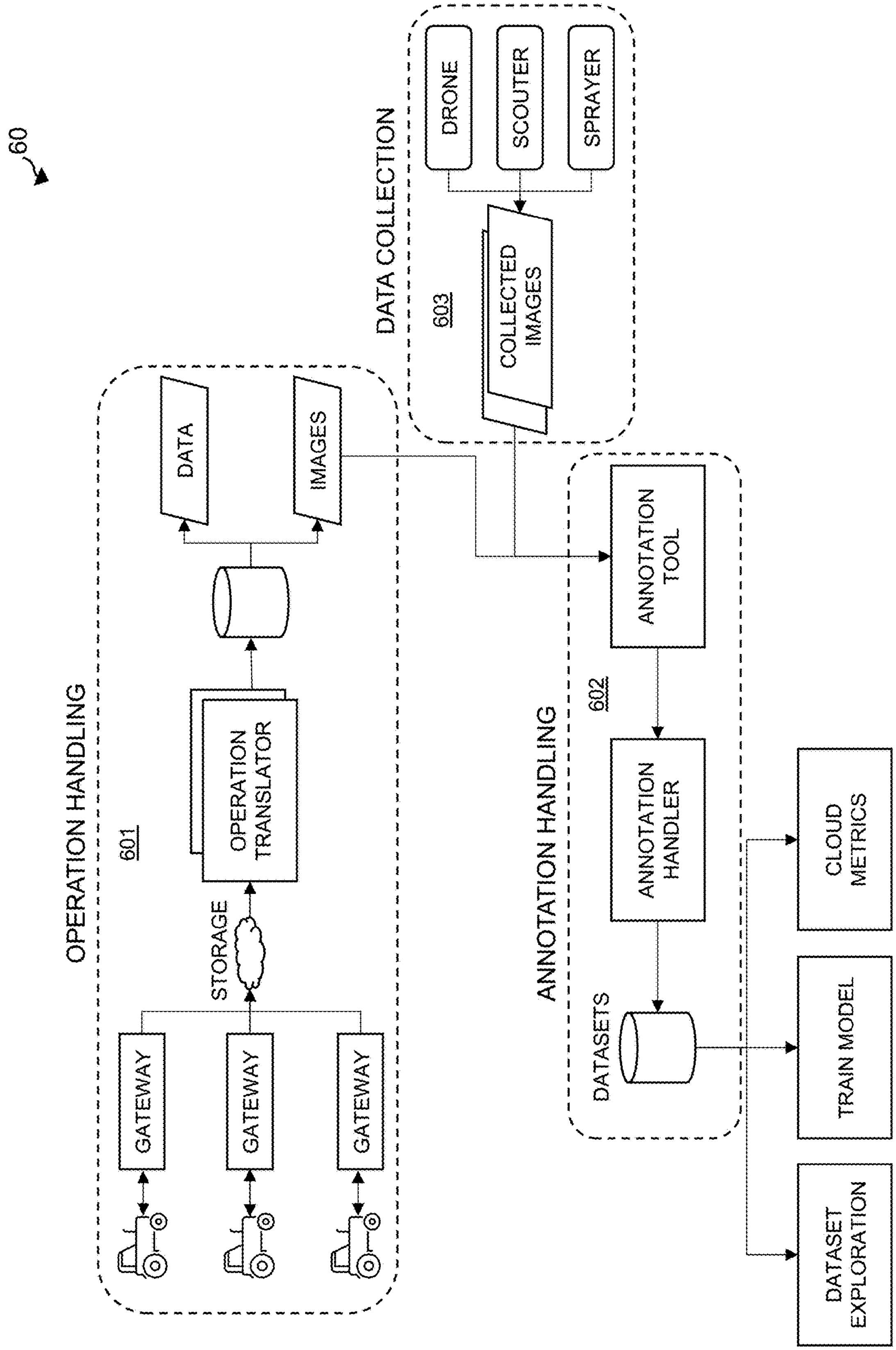
FIG. 6 is a block diagram of a system for sampling images of an agricultural field, according to an embodiment.

FIG. 6 illustrates various components and data flows of a system 60 for sampling images of an agricultural field, according to an embodiment. The system 60 generally includes an operation handling component 601, an annotation handling component 602, and a data-collection component 603.

The data-collection component 603 can include one or more devices that can capture images of a field but that may not include the hardware needed to spray the field. Examples of such devices include a drone, a scouter (e.g., scout system 30), a portable device that includes a digital camera (e.g., a smartphone, a tablet, a digital SLR camera, etc.). The devices collect images of the field and send those images to a cloud server where the images are provided to the annotation handling component 602 for annotation.

Figure 7:
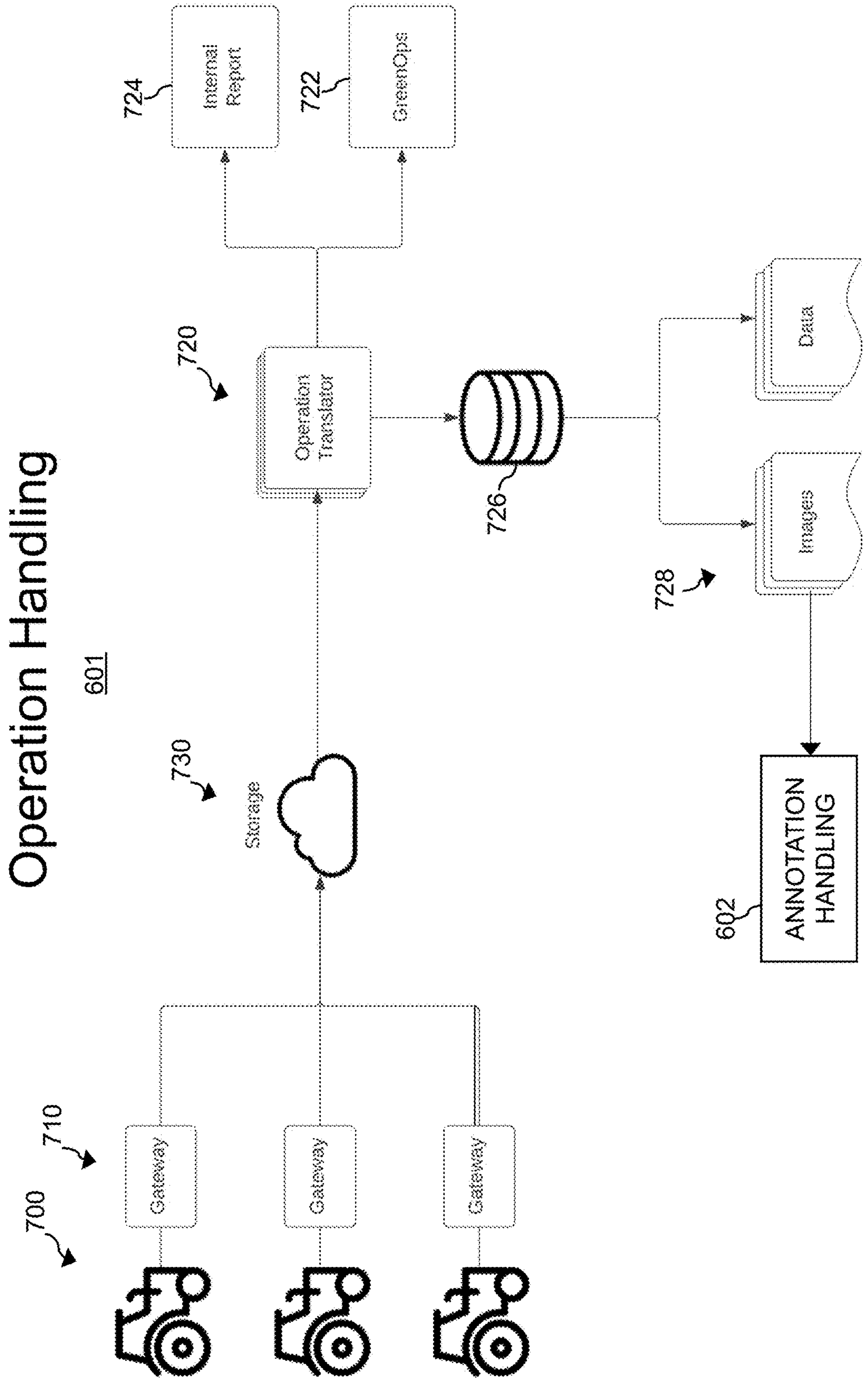
FIG. 7 is a block diagram of the operation handling component illustrated in FIG. 6.

FIG. 7 is a block diagram that includes additional details regarding the operation handling component 601. The operation handling component 601 includes multiple trained selective-spraying devices 700 which can be the same as system 10 and/or 20. Each device 700 is in electrical communication (e.g., network communication) with or electrically coupled to a respective gateway 710. In another embodiment, one gateway 710 is in electrical communication with or electrically coupled to two or more devices 700. The gateways 710 are in network communication an operation translator 720.

The gateway(s) 710 can be implemented as a service that runs on a central computer that is in network communication with one or more devices 700. In some embodiments, a single gateway 710 can be in network communication with up to 12 devices 700. The gateways 710 can be configured to automatically upload the sampled data/images to cloud storage 730, which can be on one or more servers. The gateway 710 can also handle internet disconnection, poor connectivity, and/or other network/communication issues.

The gateway 710 can be configured to control the data-collection strategy for one or more devices 700 that is/are in network communication with the gateway 710. For example, the gateway 710 can be configured to control (e.g., by sending control signals to the devices 700) the volume of sampled data/images collected from the device(s) 700. Parameters that can be programmably set in the gateway 710 to control the volume of sampled data/images include the maximum images saved from each camera/image sensor and/or the amount of time between saving sessions. Additional data that can be collected include log levels such as telemetries, events, timing measures, and/or environmental parameters/data.

Example parameters from the gateway are illustrated in table 80 in FIG. 8. The equations in the average-report-per-second column of table 80 are based on a maximum vehicle velocity of 12 miles per hour which approximately translates to 20 frames per second (taking into account the image field of view).

The operation translator 720 is configured to listen to new operations in the cloud storage 730 such as when new sampled images/data are saved to cloud storage 730. The operation translator 720 can parse the data stored in cloud storage 730 into images (e.g., image data), telemetries (e.g., telemetry data), and/or other data types. The output of the operation translator 720 is coupled to GreenOps 722, Internal Reports 724, and an image database 726 to provide the sampled images 728 to the annotation handling component 602.

Figure 9:
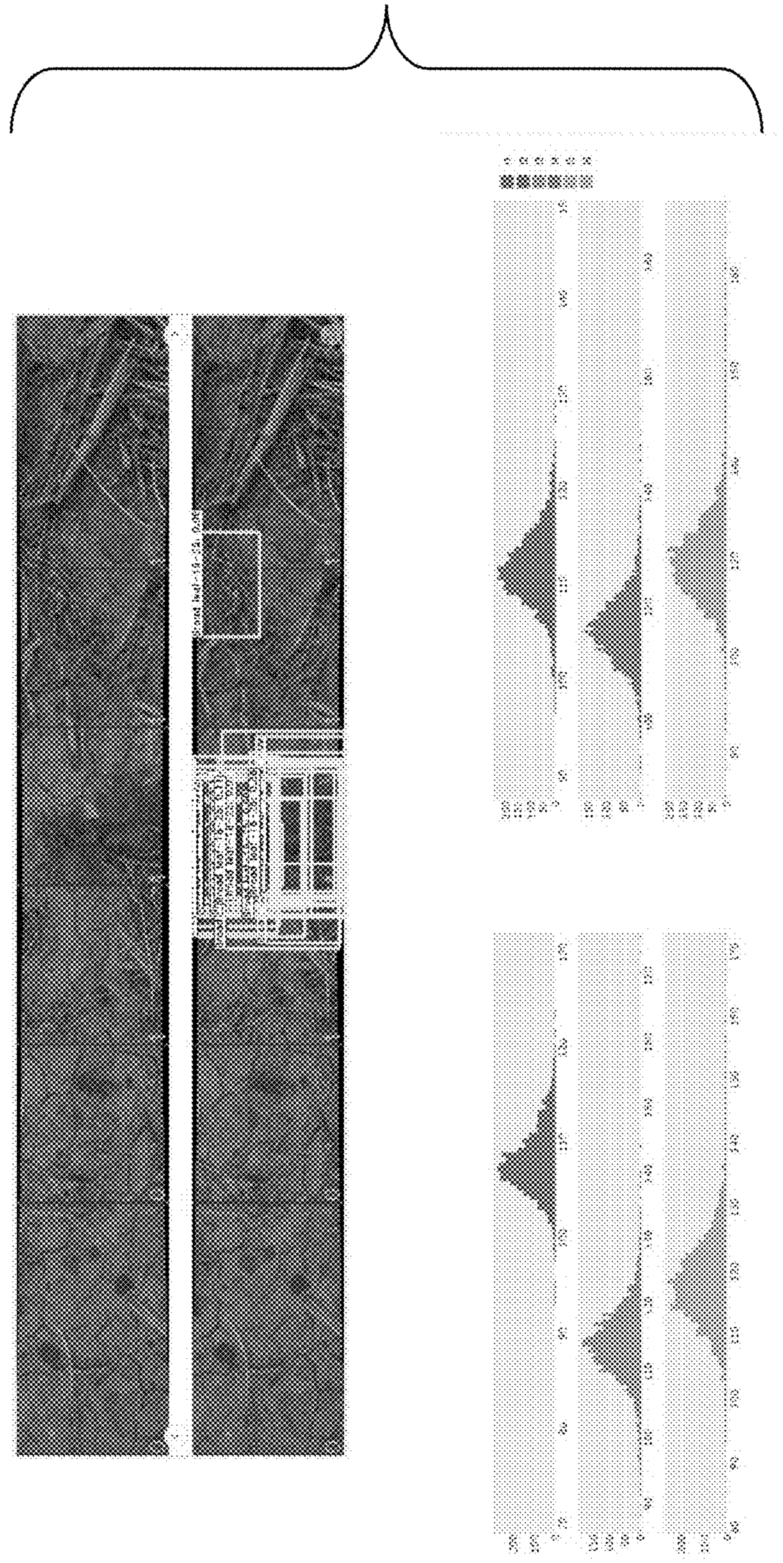
FIG. 9 illustrates an example visual report.

GreenOps 722 is an internal dashboard for the customer that can provide information relating to the selective spray operation. The internal reports 724 are visual reports that include statistics about and/or images from a spray operation. An example of a visual report 90 provided in the internal reports 724 is illustrated in FIG. 9.

Figure 10:
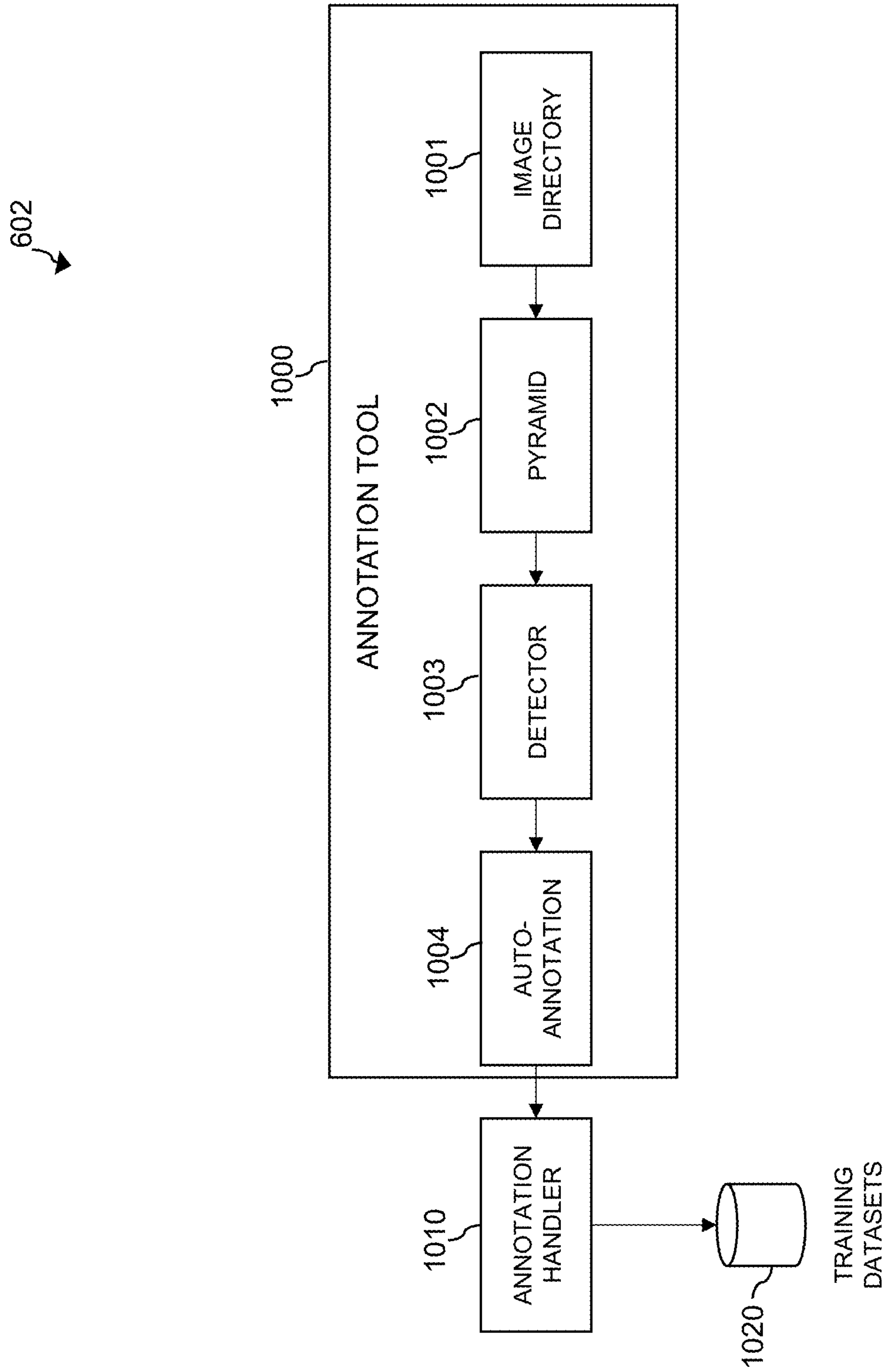
FIG. 10 is a block diagram of the annotator handling component illustrated in FIG. 6.

The annotation of the sampled images is performed by annotator handing component 602 (FIG. 6). FIG. 10 is a block diagram of the annotator handling component 602 according to an embodiment. The annotator handling component 602 includes an annotation tool 1000, an annotation handler 1010, and non-volatile computer storage 1020. The output of the annotation tool 1000 is coupled to the input of the annotation handler 1010. The output of the annotation handler 1010 is coupled to the input of the computer storage 1020.

The annotation tool 1000 receives images (e.g., images 728) from the operation handling component 601 and/or images from the data collections component 603.

In an embodiment, the annotation tool 1000 can include an image directory application 1001, a pyramid application 1002, a detector application 1003, and an auto-annotation application 1004. Each application 1001-1004 can be a separate application or some or all of the applications 1001-1004 can be combined into a larger application (e.g., into the annotation tool 1000). The annotation tool 1000 includes a trained machine-learning model that automatically analyzes each image and predicts and/or marks whether the respective image contains one or more target features. The trained machine-learning model can be used by a human tagger to review the results.

The image directory application 1001 includes an internal application to upload images (e.g., from the operation translator). The images can be divided or grouped by project, fields, rows within a field, and/or another grouping.

The pyramid application 1002 is configured to create a high-resolution zoomable image from each collected image. An example of a high-resolution zoomable image is a Deep Zoom Image (DZI). A high-resolution zoomable image, such as a DZI, is a fast way to load images in any zoom level and to handle any image size.

The detector application 1003 is configured to make predictions of the high-resolution zoomable image. The predictions can include whether the image includes one or more target features (e.g., as described herein). The detector application 1003 can be implemented using a trained machine learning model such as trained machine learning model 114A. The detector application 1003 can be the same as the detector 510.

Figure 11A:
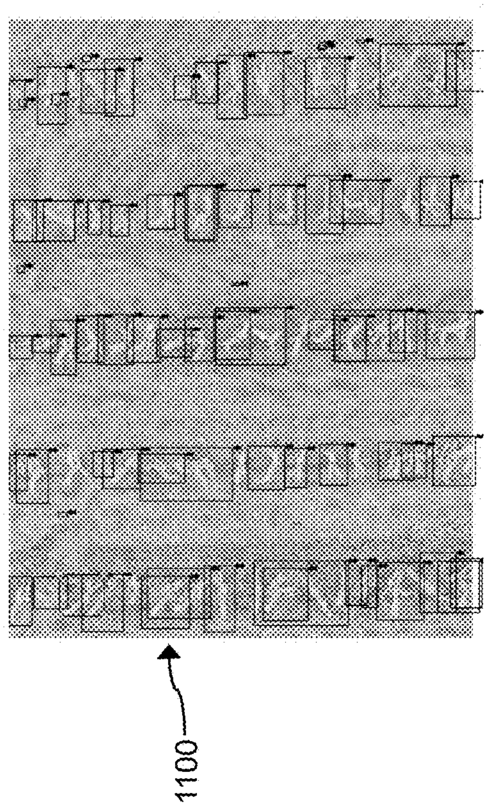
FIGS. 11A and 11B are example images with bounding boxes indicating target features.
Figure 11B:
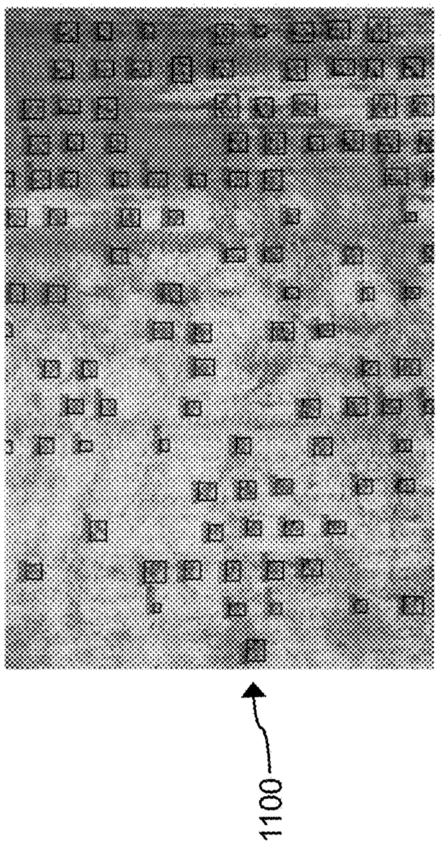

The annotation application 1004 is configured to automatically annotate the images as containing or not containing one or more target features (e.g., as described herein). Example bounding boxes 1100 that illustrate target features in example images are provided in FIGS. 11A and 11B. The bounding boxes 1100 are provided for illustration purposes only and are not provided by the annotation application 1004.

The annotation handler 1010 represents an output of a human tagger that reviews the annotated images produced by the annotation application 1004. The annotation handler 1010 creates annotation files (e.g., making the data in a format needed to train the machine learning model) that can be used to train a machine learning model and/or to test a trained machine learning model. Training datasets 1020 can be created by a downloader tool and saved in a database such as an SQL database. The training datasets can be accessed by a machine learning model or other model for training.

Figure 12:
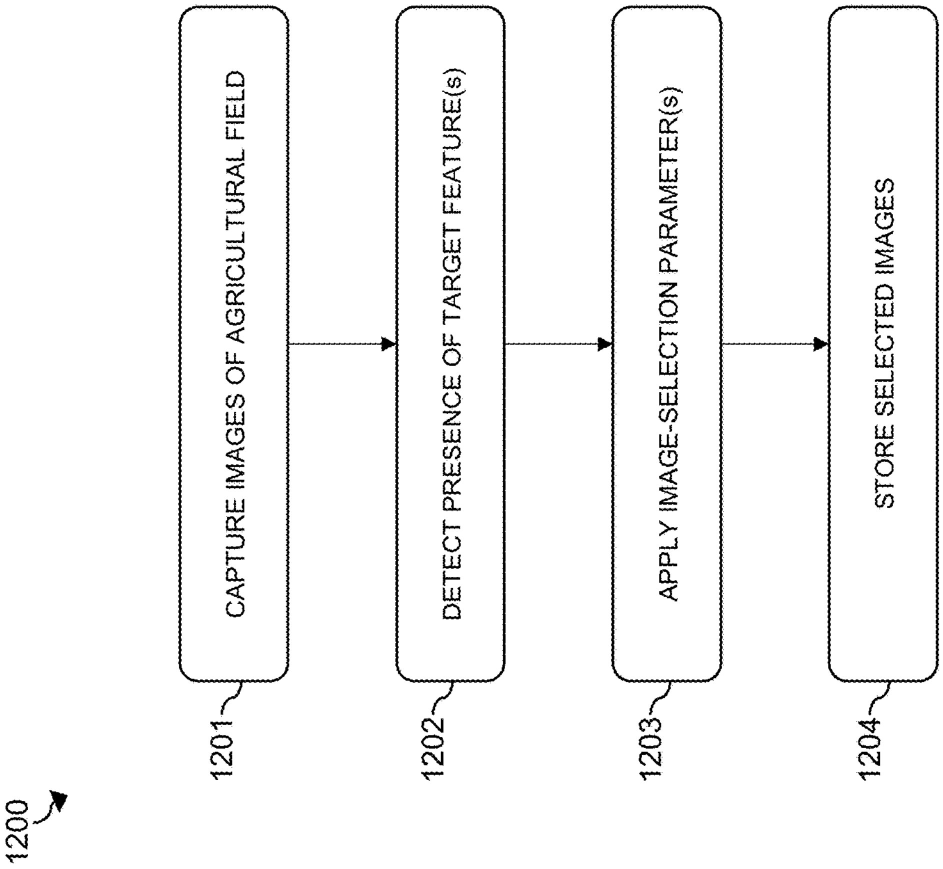
FIG. 12 is a flow chart for a method for sampling images to improve detection accuracy, according to an embodiment.

FIG. 12 is a flow chart for a method 1200 for sampling images to improve detection accuracy, according to an embodiment. In step 1201, images of an agricultural field are captured. The images can be captured using a selective spray system (e.g., system 10 and/or 20), a scout system 40, a camera, and/or another device and/or another system.

In step 1202, the images are analyzed with a trained machine learning model to detect the presence of one or more target features. The output of step 1202 can include a first subset (or group) of the images that includes the target feature(s) and a second subset (or group) of the images that does not include the target feature(s).

In step 1203, one or more image-selection parameters are applied to the images to select a group of images to store. The image-selection parameters can include a predetermined number or percentage of images from the first and/or second subsets. The image-selection parameters can also include the date, time of day, month, weather conditions, and/or other conditions of the images. The image-selection parameters can also include image parameters such as brightness, gain (e.g., high gain and/or low gain), contrast (e.g., high contrast, low contrast, and/or a predetermined contrast ratio), and/or other image parameters. The image-selection parameters can also include the confidence level of the trained machine learning model in the detection of the target feature(s) in each image.

In some embodiments, the images can be annotated (e.g., by an annotator handling component 602) prior to or after the image-selection parameters are applied in step 1203.

In step 1204, the selected images in the group are stored in non-volatile computer memory. The selected images can be used as training images and/or as additional training images to improve the training of a machine learning model.

In some aspects, a monitoring system is provided for the devices and/or systems described herein. The monitoring system can provide for a single dashboard with information about all the systems and/or devices sold to customers. The monitoring system can include the following components: Prometheus, Thanos, and Grafana. Prometheus is or includes a metrics scraping system that is responsible for fetching metrics from system components, persist them, and serve them to the client. Thanos can provide or include long-term persistence and cross-cluster metrics scraping. Grafana can provide or include metrics and information visualization. Grafana can function as Prometheus's client in this setup. For example, Grafana can fetch metrics from Prometheus and present them in user-friendly dashboards.

Smart sampling can make the selective data available for the monitoring and diagnosis system. If the data is not smart sampled you may get trivial results in the monitoring because the interesting/relevant data to analyze is rarely there.

In an embodiment, a system is configured to store images in conjunction with an already trained machine learning (ML) model, for training and debugging purpose. The system can include an agricultural vehicle, one or more cameras, a processing unit, and a storage unit. The agricultural vehicle can include a spray boom configured to spray a substance. The camera(s) can be mounted on the spray boom and/or on the agricultural vehicle. The camera(s) is/are configured to capture images of an agricultural field in the direction of movement of the agricultural vehicle. The processing unit includes storage space operative to store at least one of the captured images and an already-trained ML model configured to detect a weed or other target growth in each captured image. The storage unit includes computer memory that can store the captured images. The processing unit is configured to store selected images using a decision algorithm based on detection parameters of the trained ML model thereby enabling usage of the stored images to future train the ML model using real data (e.g., images) from the agricultural field.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A system comprising:

an agricultural vehicle;

one or more cameras in mechanical communication with the agricultural vehicle, the one or more cameras configured to capture images of an agricultural field in a direction of movement of the agricultural vehicle;

one or more microprocessors in communication with the one or more cameras, the one or more microprocessors in mechanical communication with the agricultural vehicle; and non-volatile computer memory operatively coupled to the one or more microprocessors, the non-volatile computer memory in mechanical communication with the agricultural vehicle, the non-volatile computer memory storing computer-readable instructions that, when executed by the one or more microprocessors, cause the one or more microprocessors to:

automatically analyze each image for a presence of at least one target plant in a detector that includes a trained machine-learning model, the trained machine-learning model having been trained with first images that include the at least one target plant and second images that do not include the at least one target plant, automatically detect, in the detector that includes the trained machine-learning model, the at least one target plant in a subset of the images, automatically apply, in a recorder coupled to an output of the detector and a respective output of the one or more cameras, a programmable image-selection parameter to the subset of the images in which the at least target plant is detected to select one or more of the images, from the subset of the images in which the at least target plant is detected, to store for machine-learning training, the image-selection parameter applied while the system moves across the agricultural field, the image-selection parameter controlling a volume of collected images, and automatically store, using the recorder while the system moves across the agricultural field, only the one or more of the images in which the at least target plant is detected, selected using the image-selection parameter, for the machine-learning training in a computer storage device operably coupled to the one or more microprocessors.

2. The system of claim 1, wherein:

the subset is a first subset, the one or more images are one or more first images, and the computer-readable instructions, when executed by the computer, further cause the one or more microprocessors to:

automatically apply the image-selection parameter to a second subset of the images to select one or more second images, from the second subset of the images, to store for the machine-learning training, the trained machine-learning model not detecting the at least one target plant in the second subset of the images, and automatically store only the one or more second images, selected using the image-selection parameter, for the machine-learning training in the computer storage device.

3. The system of claim 1, wherein the image-selection parameter comprises a maximum number of the collected images from each camera.

4. The system of claim 1, further comprising a spray boom attached to the agricultural vehicle, the one or more cameras mounted on the spray boom.

5. The system of claim 1, wherein the one or more microprocessors is/are in network communication with a gateway, the gateway configured to:

send a control signal to set the image-selection parameter, and receive the one or more images to store in a cloud storage.

6. The system of claim 1, wherein the image-selection parameter comprises a sampling rate of the subset of the images.

7. A system comprising:

an agricultural vehicle;

one or more cameras in mechanical communication with the agricultural vehicle, the one or more cameras configured to capture images of an agricultural field in a direction of movement of the agricultural vehicle;

one or more microprocessors in communication with the one or more cameras, the one or more microprocessors in mechanical communication with the agricultural vehicle; and non-volatile computer memory operatively coupled to the one or more microprocessors, the non-volatile computer memory in mechanical communication with the agricultural vehicle, the non-volatile computer memory storing computer-readable instructions that, when executed by the one or more microprocessors, cause the one or more microprocessors to:

automatically analyze each image for a presence of at least one target plant in a detector that includes a trained machine-learning model, the trained machine-learning model having been trained with first images that include the at least one target plant and second images that do not include the at least one target plant, automatically detect, in the detector that includes the trained machine-learning model, the at least one target plant in a subset of the images, automatically apply, in a recorder coupled to an output of the detector and a respective output of the one or more cameras, a programmable image-selection parameter to the subset of the images in which the at least target plant is detected to select one or more of the images, from the subset of the images in which the at least target plant is detected, to store for machine-learning training, the image-selection parameter applied while the system moves across the agricultural field, the image-selection parameter including one or more target image properties, and automatically store, using the recorder while the system moves across the agricultural field, only the one or more of the images in which the at least target plant is detected, selected using the image-selection parameter, for the machine-learning training in a computer storage device operably coupled to the one or more microprocessors.

8. The system of claim 7, wherein the one or more target image properties include a target weather condition.

9. The system of claim 7, wherein the one or more target image properties include a target time of day.

10. The system of claim 7, wherein the one or more target image properties include a target date and/or a target month.

11. The system of claim 7, wherein the one or more target image properties include a target brightness, a target gain, and/or a target contrast.

12. The system of claim 7, wherein the one or more target image properties include one or more target ambient conditions.

13. A system comprising:

an agricultural vehicle;

one or more cameras in mechanical communication with the agricultural vehicle, the one or more cameras configured to capture images of an agricultural field in a direction of movement of the agricultural vehicle;

one or more microprocessors in communication with the one or more cameras, the one or more microprocessors in mechanical communication with the agricultural vehicle; and non-volatile computer memory operatively coupled to the one or more microprocessors, the non-volatile computer memory in mechanical communication with the agricultural vehicle, the non-volatile computer memory storing computer-readable instructions that, when executed by the one or more microprocessors, cause the one or more microprocessors to:

automatically analyze each image for a presence of at least one target plant in a detector that includes a trained machine-learning model, the trained machine-learning model having been trained with first images that include the at least one target plant and second images that do not include the at least one target plant, automatically detect, in the detector that includes the trained machine-learning model, the at least one target plant in a subset of the images, automatically apply, in a recorder coupled to an output of the detector and a respective output of the one or more cameras, a programmable image-selection parameter to the subset of the images to select one or more of the images in which the at least target plant is detected, from the subset of the images in which the at least target plant is detected, to store for machine-learning training, the image-selection parameter applied while the system moves across the agricultural field, the image-selection parameter representing one or more outputs from the trained machine-learning model, and automatically store, using the recorder while the system moves across the agricultural field, only the one or more of the images in which the at least target plant is detected, selected using the image-selection parameter, for the machine-learning training in a computer storage device operably coupled to the one or more microprocessors.

14. The system of claim 13, wherein the one or more outputs from the trained machine-learning model include a confidence level that the target plant is detected.

* * * * *